(12) United States Patent
Rogers

(10) Patent No.: US 6,614,510 B1
(45) Date of Patent: Sep. 2, 2003

(54) MULTI-FUNCTION OPTICAL SYSTEM

(75) Inventor: Philip L. Rogers, Fauquier County, VA (US)

(73) Assignee: Optical Air Data Systems L.P., Manassas, VA (US)

( * ) Notice: Subject to any disclaimer, the term of this patent is extended or adjusted under 35 U.S.C. 154(b) by 0 days.

(21) Appl. No.: 09/549,497

(22) Filed: Apr. 14, 2000

(51) Int. Cl.[7] .............................. B01C 3/08; H04B 10/12; F41G 3/26
(52) U.S. Cl. ...................... 356/4.01; 359/341.1; 434/22; 434/27; 463/51
(58) Field of Search ...................... 356/4.01; 359/124, 359/341, 341.1; 434/22, 21, 27; 463/51

(56) References Cited

U.S. PATENT DOCUMENTS

| | | | | |
|---|---|---|---|---|
| 3,633,285 A | * | 1/1972 | Sensney | |
| 3,898,747 A | * | 8/1975 | Marshall | |
| 4,561,849 A | * | 12/1985 | Eichweber | 434/22 |
| 4,713,544 A | * | 12/1987 | Grage | |
| 4,825,091 A | * | 4/1989 | Breyer et al. | |
| 4,959,016 A | * | 9/1990 | Lawrence | 434/22 |
| 5,276,543 A | * | 1/1994 | Olshansky | 359/124 |
| 5,636,992 A | * | 6/1997 | Mastrangelo | 434/21 |
| 5,788,500 A | * | 8/1998 | Gerber | 434/22 |

* cited by examiner

Primary Examiner—Stephen C. Buczinski
(74) Attorney, Agent, or Firm—Clark & Brody

(57) ABSTRACT

An optical system is formed of a plurality of optical sources and components of different laser-based equipment systems. The sources and/or components may be combined and/or eliminated to reduce complexity, cost and/or overall weight of the system by consolidating multiple laser sources into a reduced number of sources, and by multiplexing different wavelength signals over common carriers. A laser engagement system and an infrared aim light (or infrared illuminator) are powered by a single laser source which is adopted for use with conventional equipment by lengthening the duration of the coded pulses emitted by the transmitter. The transmitter may be triggered in response to the heat and/or pressure generated by the blank upon firing. A visible bore light may be eliminated by connecting infrared and/or visible aim light directly to a rifle barrel.

31 Claims, 2 Drawing Sheets

MULTI-FUNCTION OPTICAL SYSTEM

FIELD OF THE INVENTION

The present invention relates generally to optics and optical systems and devices. The present invention also relates to a method of operating a multi-functional optical system.

BACKGROUND OF THE INVENTION

Multi-function laser-based systems are employed for a variety of purposes. For example, it has been suggested to provide up to seven different laser-based equipment systems in combination, including the following: (1) a laser range finder; (2) an infrared aim light; (3) an infrared illuminator (a flashlight); (4) a visible aim light; (5) a visible bore light (a mandrel boresight laser for aligning sights); (6) a combat identification system; and (7) a multiple integrated laser engagement system for laser-tag simulated exercises, referred to herein as a "laser simulation system."

Prior art multi-function laser-based systems are generally complex and bulky. There is a need in the art for a system in which components are combined and/or eliminated to reduce complexity, cost and overall weight. In particular, there is a need for an optical system which provides multiple functions with a reduced number of optical sources and/or other components. Additionally, there is a need for an uncomplicated method of operating a multi-function optical system.

SUMMARY OF THE INVENTION

The disadvantages of the prior art are overcome to a great extent by the present invention. Although the invention is illustrated in the drawings in connection with known functions, the invention is considered applicable to a number of other uses as well. In general, the invention may be applicable wherever complexity, cost and/or weight can be reduced by combining the functionality of optical sources and/or other components.

According to one aspect of the invention, a plurality of optical sources and components of different laser-based equipment systems are combined and/or eliminated to reduce complexity, cost and/or overall weight. This aspect may be accomplished by consolidating multiple laser sources into a reduced number of sources, and by multiplexing different wavelength signals over common carriers, and there are other aspects of the invention.

According to another aspect of the invention, a laser simulation system and an infrared aim light (or infrared illuminator) are powered by a single laser source. According to this aspect of the invention, a single laser source can be adopted for the laser simulation system by lengthening the duration of the coded pulses emitted by the laser simulation system transmitter. The shorter wavelength pulses are attenuated to a greater degree by the filter cap on the laser simulation system receiver. Thus, by lengthening the pulses, the laser simulation system receiver is actuated by the pulses in the same way as if they were conventional pulses. The laser simulation system receiver may optionally be located on the person who is being targeted.

According to another aspect of the invention, the laser simulation system transmitter is triggered in response to the heat and/or pressure generated by blank ammunition gasses upon firing. This provides a way to ensure that the transmitter is only initiated when someone actually pulls the trigger on the laser simulation system.

According to another aspect of the invention, the visible bore light (item (5) mentioned above) may be eliminated by connecting the infrared and/or visible aim light directly to the rifle barrel.

According to another aspect of the invention, a multi-function lens systems is provided which integrates multiple lenses for outputting several different functions. The lens system may be formed of first and second lenses fixedly connected to each other, or one formed on a portion of the other, with each lens providing various functional outputs. Optionally, the first lens can be a collimating lens.

According to yet another aspect of the invention, a method of fabricating an optical system comprised of a plurality of optical sources and components of different laser-based equipment systems is provided. Laser sources operated at different wavelengths are wavelength division multiplexed (WDM) through various optical transmission lines to power six or more different functional outputs.

These and other advantages and features of the invention will become apparent from the following detailed description of the invention which is provided in conjunction with the accompanying drawings.

DETAILED DESCRIPTION OF PREFERRED EMBODIMENTS

Figure 1:
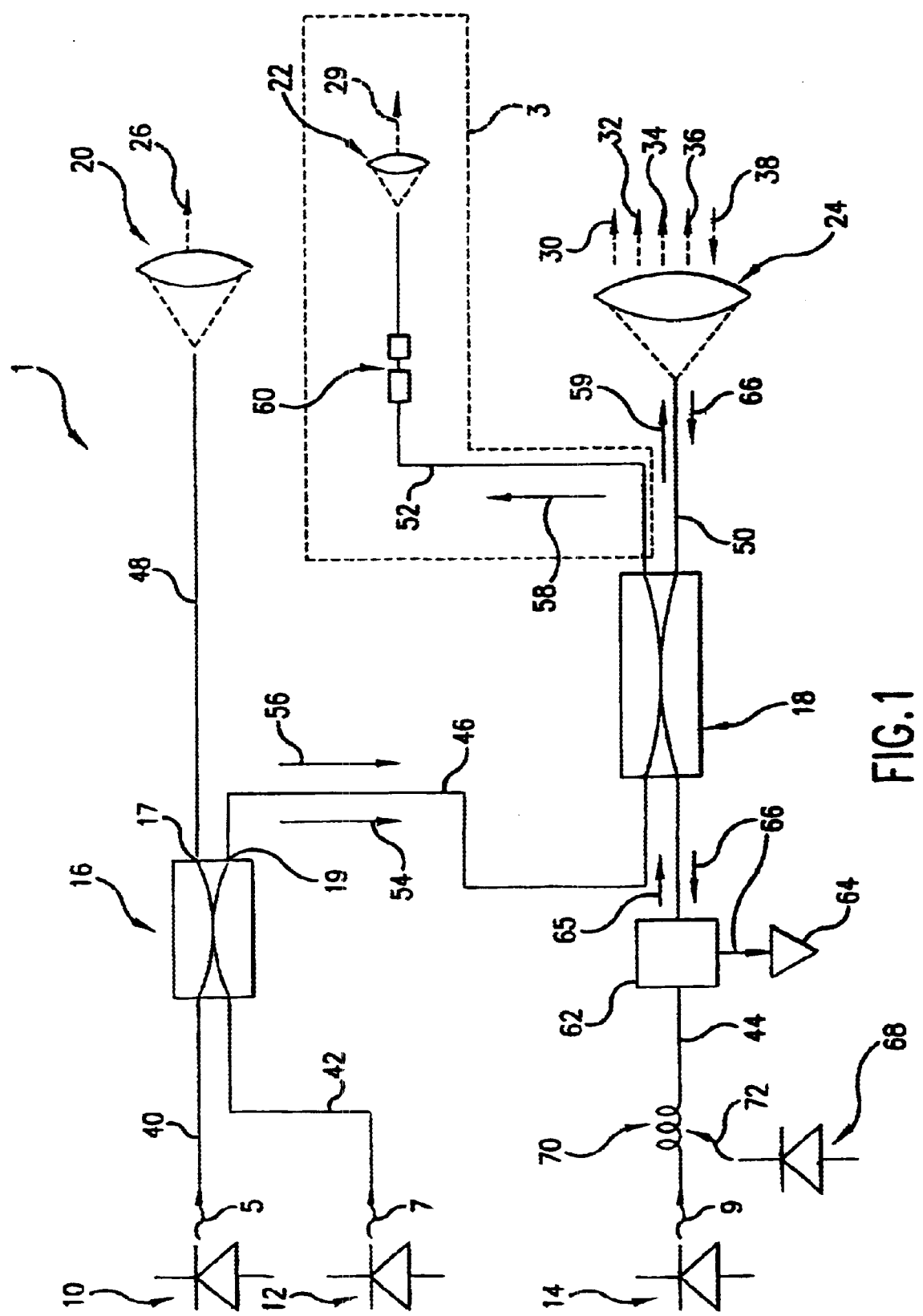
FIG. 1 is a schematic view of an optical system constructed in accordance with a preferred embodiment of the invention.

Referring now to the drawings, where like reference numerals designate like elements, there is shown in FIG. 1 an optical system 1 constructed in accordance with a preferred embodiment of the invention. The illustrated system 1 has a first source 10 for generating a first input laser energy 5. The first input energy 5 may have a wavelength in the near infrared spectrum (the infrared spectrum near the visible spectrum), for example from about 820 nanometers (nm) to about 860 nm, preferably about 825 nm.

The first input energy 5 propagates through an optical transmission line 40 and is launched into an optical coupler or splitter 16. The coupler 16 distributes optical power among two or more ports 17, 19. The coupler 16 directs a first portion of the input energy 5 into transmission line 48 and a second portion of the input energy 5 into transmission line 46 (in direction 56). The split of the first portion and the second portion will depend upon the requirements of the system. For example the split may be 60% to 40%, 80% to 20%, 100% to 0%, or other split. The input energy 5 propagating in transmission line 48 enters a lens 20 and is output from the lens 20 as an infrared illuminating light 26.

The input energy 5 propagating through transmission line 46 enters a multiplexer 18. The input energy 5 is transmitted through the multiplexer 18 and is launched into transmission line 50 (in direction 59) to enter a second lens 24. Light energy 5 output from the second lens 24 may be used in a laser training simulation system. A conventional laser simulation system source operates at 904 nanometers. Thus, according to the illustrated embodiment, the 825 to 860 nanometers source 10 is adopted for the laser simulation system by lengthening the duration of the coded pulses 30. The shorter wavelength pulses (825 nm to 860 nm, which are shorter than the conventional 904 nm) are attenuated to a greater degree by the filter cap (not shown) on the known laser simulation system receiver (not shown). Thus, the laser simulation system receiver is actuated by the 825 to 860 nm pulses in the same way as if they were 904 nm pulses. The laser simulation system receiver may be located on the person (not shown) who is targeted by the laser simulation system transmitter 24.

In a known laser simulation system, the user pulls a trigger to fire a blank cartridge to simulate the firing of an actual round and, in response, a sensor on the laser simulation system transmitter triggers the laser. The player identification and transmitter type can be encoded on the laser beam using a laser simulation system code. An electronic controller is connected through an amplifier to the optical detectors to decode the output signals thereof and provide an indication that the person carrying the receiver has been hit by the laser.

It is possible, however, for a user to simulate the firing of a blank cartridge without actually firing a blank by manipulating the rifle to "re-coil" such that the laser simulation system transmitter is operated. Thus, the laser shot from that transmitter can go unrecognized, giving the user an unfair advantage. To overcome these problems, the present invention provides a laser simulation system transmitter 10, 24, 30 that is trigger in response to the heat and/or pressure generated by the blank ammunition gasses upon firing. This provides a way to ensure that the transmitter 10, 24, 30 is only initiated when the user actually pulls the trigger (not shown).

Further, the optical system 1 has a second driver or source 12 for providing a second input energy 7. The second input energy 78 may be laser light with a wavelength in the visible spectrum (e.g., about 630 nm to about 650 nm, preferably about 635 nm). The second input energy 7 propagates through optical transmission line 42 into the coupler 16. The coupler 16 directs about 100% of the input energy 7 into transmission line 46 in direction 54. The input energy 7 propagating through transmission line 46 enters the multiplexer 18. The multiplexer 18 directs the input energy 7 into transmission line 50 in direction 59 to enter the second lens 24. The input energy 7 output from the second lens 24 may be used as a visible aiming light 32.

In addition, a third driver or source 14 may be used to provide a third input energy 9 having a wavelength of about 1530 nm to about 1555 nm, preferably about 1538 nm. In a preferred embodiment, the third input energy 9 is amplified by an erbium-doped fiber amplifier 70 for further propagation in transmission line 44

The third input energy 9 traveling along optical transmission line 44 enters circulator 62 which acts as a passive waveguide junction between the multiplexer 18 and a photodetector 64. The third input energy 9 transmitted out of the circulator 62 in direction 65 enters the multiplexer 18. The multiplexer 18 inputs the third input energy 9 into transmission line 50 in direction 59. Thus, the input energy 9 exits the second lens 24 as fifth output light 34, which may be used, for example as a combat identification transmission.

Additionally, the input energy 9 exiting the lens 24 may form a light 36 for a laser rangefinder system. According to this aspect of the invention, the output light 36 is returned back to the lens 24 as returned light 38, which may be used to determine target position, target coordinates and the like.

The returned light 38 is propagated back through optical communication line 50 in direction 66 to the multiplexer 18 and from there through the circulator 62 and into a photodetector 64. The photodetector 64 may be a processor-based system which can receive the returned light 38 and integrate and process the information contained therein.

If desired, the optical system 1 also may be provided with visible borelight assembly 3. In the borelight assembly 3, input energy 7 travels in direction 58 along optical transmission line 52. A connector 60 is included in the transmission line 52. The input energy 7 enter an additional lens 22 and exits as optional output light 29. In an alternative embodiment of the invention, the entire borelight assembly 3 may be eliminated by connecting the output light 30 (infrared aim light) and/or the fourth output light 32 (visible aim light) directly to the rifle barrel.

Figure 2:
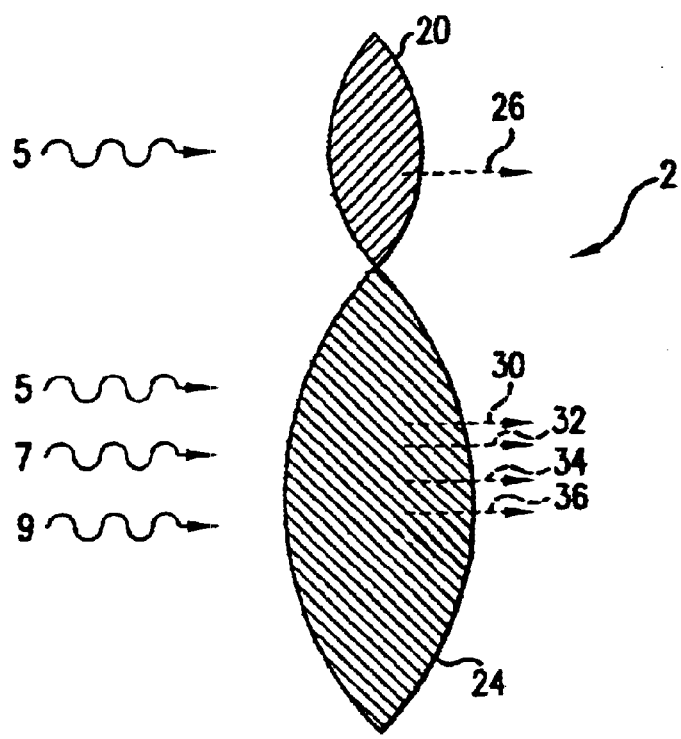
FIG. 2 is a cross sectional view of a lens device constructed in accordance with a preferred embodiment of the invention.

FIG. 2 shows a lens device 2 constructed in accordance with a preferred embodiment of the invention. Lens device 2 comprises the first lens 20 and the second lens 24 fixedly connected to each other. The first input energy 5 enters the first lens 20 and exits as an output light 26. As discussed above, the output light 26 may be used for infrared illumination.

Additionally, first input energy 5 can enter second lens 24 and exit as third output light 30, to be used in an otherwise conventional laser simulation system. The second input energy 7 enters second lens 24 and exits as fourth output light 32. The fourth output light may be used as a visible aiming light. The third input energy 9 enters second lens 24 and exits as fifth output light 34 or sixth output light 36. Preferably, the fifth output light 34 is used for combat identification transmission and the sixth output light 36 is used in a rangefinder system.

Thus, the optical system 1 has multiple functions and integrates multiple lenses for outputting light beams or several different purposes. The lens system can optionally comprise a first lens and a second lens fixedly connected to each other, with each lens providing various functional outputs.

Figure 3:
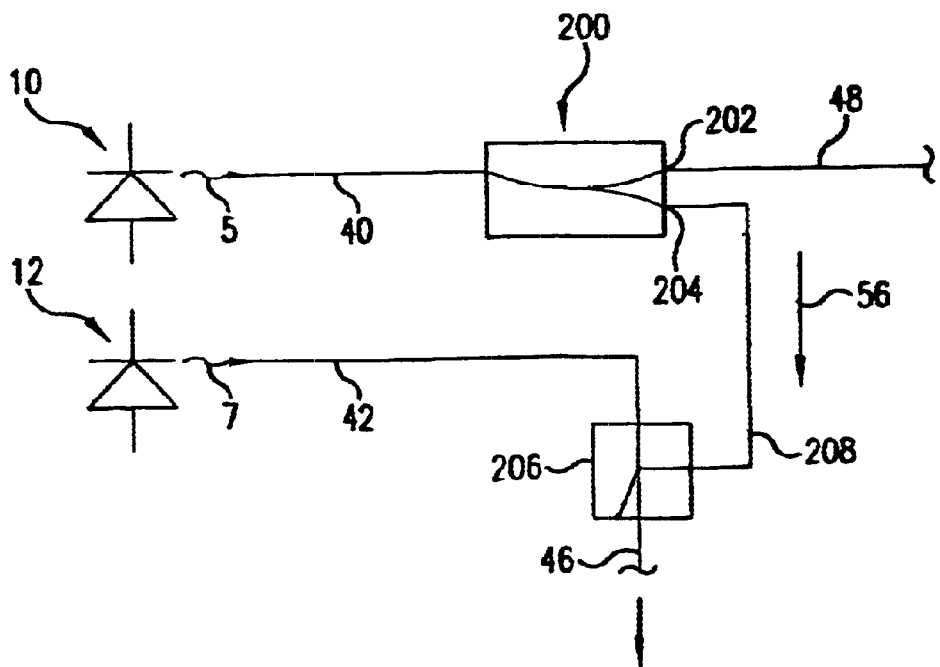
FIG. 3 is a partial schematic view of another optical system constructed in accordance with another preferred embodiment of the invention.

Referring now to FIG. 3, there is shown an alternative optical power supply system in which the first input energy 5 propagates through an optical transmission line 40 and is launched into an optical splitter 200. The splitter 200 distributes the signal 5 into two or more ports 202, 204. 40% of the power 5 may be propagated into an optical transmission line 48. 60% of the power is distributed into a second line 208. The percentages of the power distributed through the two lines 48, 208 may be changed as desired. The signal 7 from the second source 12 is transmitted through optical line 42 and is coupled with the power in the line 208 by a coupler 206. The coupler 206 outputs a desired portion of the two signals 5, 7 into an output line 46. The output line 46 is connected to the multiplexer 18 as discussed above.

Reference has been made to preferred embodiments in describing the invention. However, additions, deletions, substitutions, or other modifications which would fall within the scope of the invention defined in the claims may be implemented by those skilled in the art without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A method for providing both infrared illumination and a laser battle simulation beam comprising the steps of providing a source of electromagnetic energy, splitting said electromagnetic energy into two beams, directing a first of said two beams to a first optical system for providing said infrared illumination and directing a second of said two beams to a second optical system for transmitting said battle simulation beam.

2. A method according to claim 1 wherein said source of electromagnetic energy is a laser source operating at a wavelength in the range of 820 nm to 860 nm.

3. A method according to claim 2 further comprising coding said second of said two beams to provide coded pulses having pulse widths configured to emulate the effect of coded pulses of a beam having another wavelength that is different from said 820 nm to 860 nm on a system designed to respond to said beam of another wavelength.

4. A method according to claim 3 wherein said another wavelength is about 904 nm.

5. A method according to claim 1 wherein said first optical system comprises a first lens, said second optical system comprises a second lens, and said first and second lenses are laterally adjacent each other.

6. A method according to claim 1 further comprising providing a source of visible laser light and directing said visible laser light to said second optical element.

7. A method according to claim 1 further comprising providing a second source of electromagnetic energy and directing said electromagnetic energy from said second source so said second optical element.

8. A method according to claim 7 further comprising modulating said electromagnetic energy from said second source to provide both combat identification and range finding.

9. A method according to claim 6 further comprising providing a second source of electromagnetic energy and directing said electromagnetic energy from said second source to said second optical element.

10. A method according to claim 9 further comprising modulating said electromagnetic energy from said second source to provide both combat identification and range finding.

11. A method according to claim 9 further comprising the step of providing at least a portion of said visible laser light as a borelight on a pistol or rifle.

12. Apparatus comprising a first source of infrared electromagnetic energy, an optical splitter that receives said infrared electromagnetic energy and splits it into first and second beams, a first transmission line that receives and transmits said first beam to a first optical system, and a second transmission line that receives and transmits said second beam to a second optical system, wherein said first optical system forms said first beam into an illuminating beam and said second optical system forms said second beam into a battle simulation beam.

13. Apparatus according to claim 12 wherein said source of infrared electromagnetic energy is a diode laser operating at a wavelength in the range of 820 nm to 860 nm.

14. Apparatus according to claim 13 wherein said wavelength is about 825 nm.

15. Apparatus according to claim 13 further comprising means for coding pulses of said second beam such that pulses of said second beam, when incident on a receiver designed to detect electromagnetic radiation of a substantially different wavelength, will emulate received pulses of said electromagnetic radiation of a substantially different wavelength.

16. Apparatus according to claim 15 wherein said substantially different wavelength is about 940 nm.

17. Apparatus according to claim 12 wherein said first optical system comprises a first lens, said second optical system comprises a second lens, and said first and second lenses are laterally adjacent each other.

18. Apparatus according to claim 17 wherein said second lens is a collimating lens.

19. Apparatus according to claim 12 further comprising a source of visible light and means for directing said visible light to said second optical system.

20. Apparatus according to claim 12 further comprising a source of visible light and a bore-light assembly receiving said visible light.

21. Apparatus according to claim 12 further comprising a source of electromagnetic energy, means for directing said electromagnetic energy to said second optical system, and means for modulating said electromagnetic energy to provide a combat identification beam.

22. Apparatus according to claim 12 further comprising a source of electromagnetic energy, means for directing said electromagnetic energy to said second optical system, and means for modulating said electromagnetic energy to provide a range finder beam.

23. Apparatus according to claim 22 further comprising means for receiving a portion of said range finder beam that has been reflected.

24. Apparatus according to claim 22 further comprising means for modulating said electromagnetic energy to provide a combat identification beam.

25. Apparatus comprising a first source of electromagnetic energy having a first wavelength, a second source of electromagnetic energy having a second wavelength, a first optical system having first optical characteristics, a second optical system having second optical characteristics differing from said first optical characteristics, and means for directing light from said first source of electromagnetic energy to said first and second optical systems and light from said second source of electromagnetic energy to at least said second optical system.

26. Apparatus comprising a source of electromagnetic energy, an optical system receiving and projecting said electromagnetic energy, and means for modulating said source of electromagnetic energy to provide one characteristic to said electromagnetic energy such that said electromagnetic energy may be used in an optical range finder and a second characteristic such that said electromagnetic energy may be used for combat identification.

27. Apparatus according to claim 24 wherein said source of electromagnetic energy has a wavelength between 1530 nm and 1555 nm.

28. Apparatus according to claim 27 wherein said wavelength is approximately 1538 nm.

29. Apparatus according to claim 26 further comprising an erbium amplifier amplifying said electromagnetic energy.

30. A method of producing an infrared aim light and a laser simulation beam comprising providing a beam of electromagnetic energy from a single laser source having a wavelength compatible with an infrared aim system and modulating said beam to provide laser pulses compatible with a laser simulation system.

31. A method according to claim 30 wherein the wavelength of said single laser source is in the range of 820 nm to 860 nm.

* * * * *